United States Patent
Carrico et al.

(10) Patent No.: US 6,937,968 B1
(45) Date of Patent: Aug. 30, 2005

(54) METHOD AND APPARATUS FOR SEQUENTIALLY PROFILING AND SOLVING PROBLEMS IN SPACE MISSION ANALYSIS

(75) Inventors: John P. Carrico, Laurel, MD (US); Frank T. Stoner, Collegeville, PA (US)

(73) Assignee: Analytical Graphics, Inc., Exton, PA (US)

( * ) Notice: Subject to any disclaimer, the term of this patent is extended or adjusted under 35 U.S.C. 154(b) by 0 days.

(21) Appl. No.: 09/490,173

(22) Filed: Jan. 22, 2000

Related U.S. Application Data

(60) Provisional application No. 60/116,546, filed on Jan. 21, 1999.

(51) Int. Cl.$^7$ .............................. G06G 7/48
(52) U.S. Cl. ............... 703/8; 703/2; 703/6; 701/13; 701/23; 701/210
(58) Field of Search ................. 703/8, 6, 2; 701/13

(56) References Cited

U.S. PATENT DOCUMENTS

| | | | | |
|---|---|---|---|---|
| 5,550,742 A | * | 8/1996 | Furuya et al. | 244/161 |
| 6,048,366 A | * | 4/2000 | Ellis et al. | 703/8 |
| 6,122,572 A | * | 9/2000 | Yavnai | 701/23 |
| 6,130,705 A | * | 10/2000 | Lareau et al. | 348/144 |
| 6,442,482 B1 | * | 8/2002 | Belbruno | 701/13 |
| 6,505,119 B2 | * | 1/2003 | Schwaerzler | 701/210 |
| 6,735,557 B1 | * | 5/2004 | Castellar et al. | 703/5 |
| 6,789,054 B1 | * | 9/2004 | Makhlouf | 703/6 |
| 6,859,769 B1 | * | 2/2005 | Tanygin | 703/8 |

OTHER PUBLICATIONS

Carrico, J., et al., "Rapid Design of Gravity Assist Trajectories," Prceedings of the ESA Symposium on Spacecraft Flight Dynamics, ESA SP-326, Dec. 1991.

Carrico, J. et al., "An Interactive Tool Design and Support of Lunar, Gravity Assist . . . ," AIAA/AHS/ASEE Aerospace Design Conference, Feb. 1993, AIAA, Washington DC.

Carrico, J., et al., "Operational Use of Swingby . . . ," AAS/AIAA Astrodynamics Specialist Conference, Aug. 14-17, 1994, AAS Publications, San Diego, CA.

NASA Goodard Flight Center, "Mission Analysis and Design Tool (Swingby) User's Guide," Revision 2, Nov. 1994.

NASA Goodard Space Flight Center, "Mission Analysis and Design Tool (Swingby)—The Swingby Tutorial," Update 2 (Draft Version), Sep. 1995.

* cited by examiner

*Primary Examiner*—Jean R. Homere
*Assistant Examiner*—Fred Ferris
(74) *Attorney, Agent, or Firm*—Roberts Abokhair & Mardula, LLC

(57) ABSTRACT

A system and method for orbital planning allows iterative calculations of orbital parameters to be accomplished in an automated way with one parameter solution serving as input to the next parameter's calculation. A software program employs a graphical user interface (GUI) to allow a space mission analyst to set up a series of sub-problems of any desired level of complexity. The program then implements the series automatically and sequentially, incorporating the solution to one sub-problem into the input to the next.

6 Claims, 7 Drawing Sheets

Fig. 2

| Targeter Edit for Targeting_Profile | | | |
|---|---|---|---|
| Variables: | | | |
| ? | Name | New Value | Last Update |
| x | DV_X | 0.00000000000 km/sec | 0.00000000000 km/ |
|   | DV_Y | 0.00000000000 km/sec | 0.00000000000 km/ |

Nominal: 0.00000000000 km/sec

Correction: 0.00000000000 km/sec

New Value: 0.00000000000 km/sec

Last Update: 0.00000000000 km/sec

Tolerance: 0.0000000100 km/sec

Perturbation: 0.000100000000 km/sec

Max. Step: 0.050000000000 km/sec

Advanced Value
Scale: 0.001000000000 km/sec

☐ Use

Goals:

| ? | Name | Desired | Achieved |
|---|---|---|---|
|   | Argument_of_Periapsis | 0.00000000 | 0.00000000 |
|   | Eccentricity | 0.30000000 | 0.00000000 |
| x | Inclination | 23.50000000 | 0.00000000 |
| x | Semimajor_Axis | 43125.00000000000 km | 0.00000000 |
|   | Time_Past_Periapsis | 0.00000000 sec | 0.00000000 |

Achieved Value: 0.00000000

Desired Value: 0.30000000

Difference: 0.00000000

Convergence
Tolerance: 0.10000000

Advance Values
Scale: 1.00000000
Weight: 1.00000000

☐ Use:

OK    Cancel    Apply    Help

Figure 5
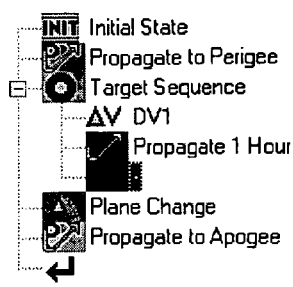
Figure 6 - Illustration of a Hohmann Transfer (Prior Art)
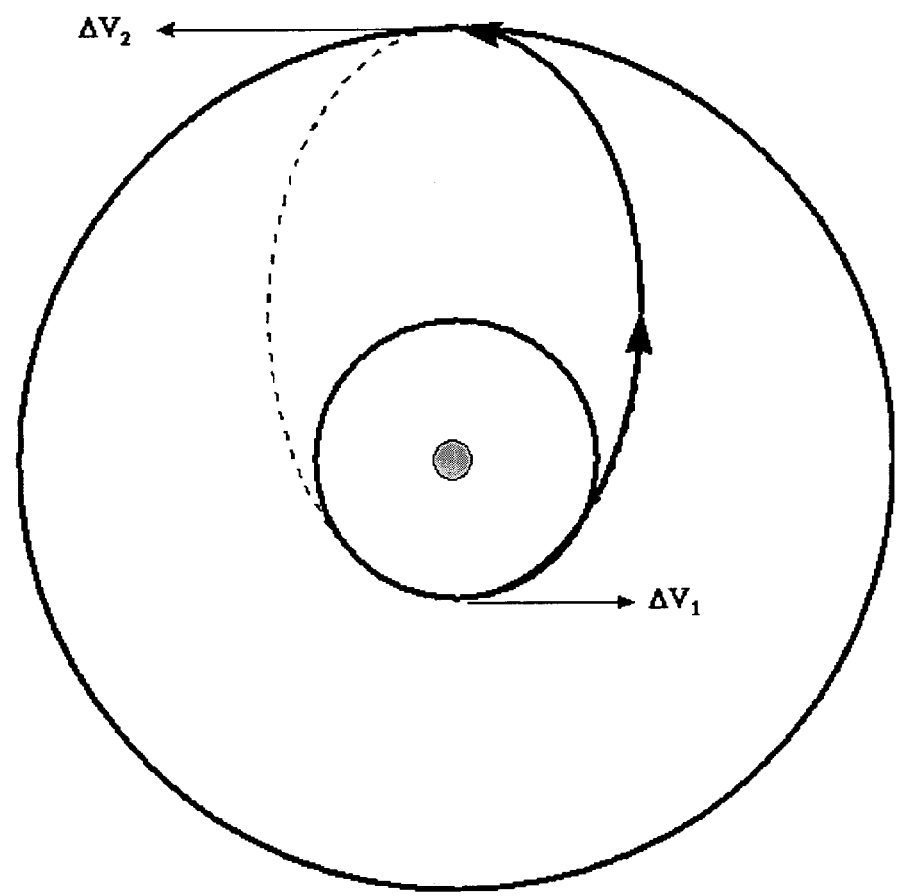

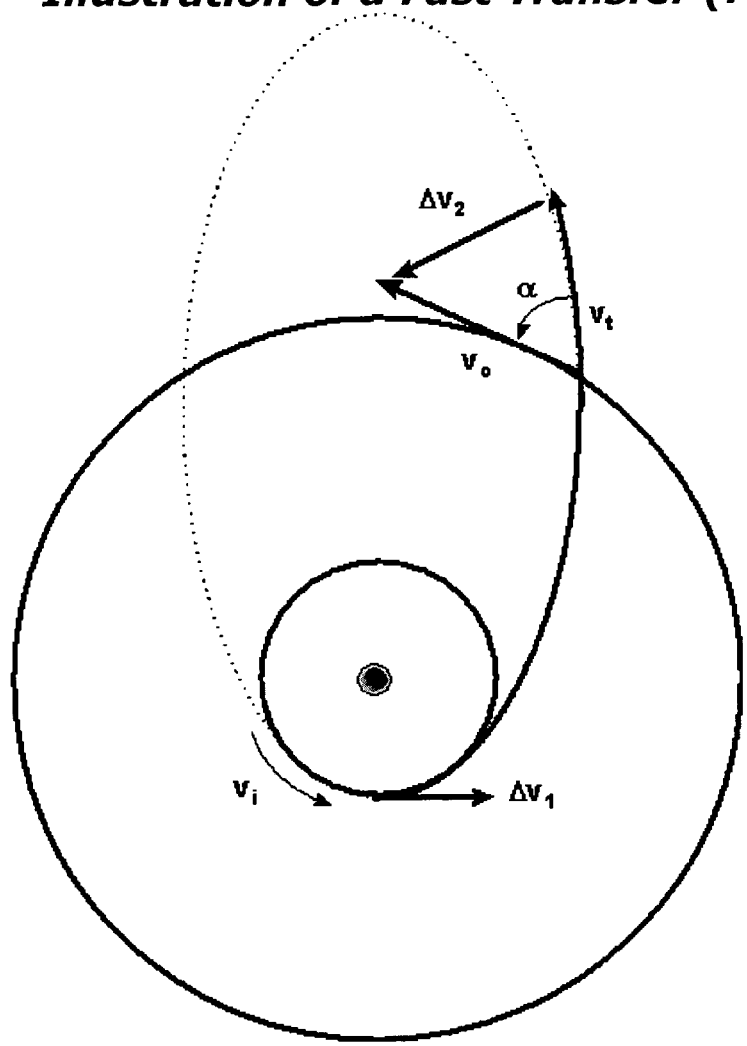
Figure 9 - Illustration of a Fast Transfer (Prior Art)

METHOD AND APPARATUS FOR SEQUENTIALLY PROFILING AND SOLVING PROBLEMS IN SPACE MISSION ANALYSIS

RELATED APPLICATIONS

This application claims priority from U.S. provisional patent application No. 60/116,546, filed Jan. 21, 1999.

BACKGROUND OF THE INVENTION

1. Field of the Invention

This invention relates generally to orbital planning. More particularly, this invention relates to a system and method for orbital planning that allows iterative calculations of orbital parameters to be accomplished in an automated way with one parameter solution serving as input to the next parameter's calculation.

2. Background Art

In the process of a space mission analysis, the analyst must often perform repetitive calculations. Frequently such calculations require the analyst to set up a problem (or "case"), run the problem, and then review the results. After reviewing the results, the analyst will set up another problem based on those results and run the calculations again. Typically, the problems are addressed and solved in order of increasing complexity.

An example of this process is determining how long to fire a spacecraft's engines, and in what direction, in order to place the spacecraft in a desired orbit. This problem can be broken down into two sub-problems. First, the analysts may wish to determine the appropriate duration of firing to achieve the desired orbit in part. After this problem is solved, and using its solution, the analyst can solve the combined problem of determining the duration and direction of the engine firing.

It has generally been necessary to use computer languages and scripts to carry out the sequential profiling and solving of a complex space mission analysis problem. That process is cumbersome and time consuming and, depending on the programming background of the analyst, may require him or her to learn a new programming or script language. The prior art includes one program that makes use of a graphical user interface (GUI) for the individual profiling of a problem, but each problem in a sequence of problems must be profiled and processed manually.

It would therefore be useful to have the ability to solve profiles for space mission planning in an automated way. Ideally a system that allows a user to establish a series of sub-profiles, solve those sub-profiles and provide the response to the next sub-profile problem would give the analyst the most flexibility in performing mission analysis.

SUMMARY OF THE INVENTION

It is an object of the present invention to provide a method that provides an analyst with the ability to solve profiles for space mission planning.

It is another object of the present invention to provide a computer system that automatically enables an analyst to solve profiles for space mission planning.

It is still another object of the present invention to provide a computer program product that enables a computer to provide an analyst with the ability to automatically solve profiles for space mission planning.

It is an object of the present invention to provide a method that provides an analyst with the ability to establish a series of sub-profiles, and which solves each of those sub-profiles and provides that solution as a basis for solving the next sub-profile in sequence.

It is another object of the present invention to provide a computer system that provides an analyst with the ability to establish a series of sub-profiles, and which solves each of those sub-profiles and provides that solution as a basis for solving the next sub-profile in sequence.

It is still another object of the present invention to provide a computer program product that enables a computer to provide an analyst with the ability to establish a series of sub-profiles, and which solves each of those sub-profiles and provides that solution as a basis for solving the next sub-profile in sequence.

Some of the above objects are obtained by a method for profiling and solving space mission problems. The method includes creating a space mission analysis scenario, and setting up a control sequence that simulates a problem to be solved in the space mission. The method further includes selecting control variables to be checked in solving the problem, and identifying parameters to be used in defining a desired results that represents an adequate solution to the problem. Additionally, the method includes establishing profiles for each particular sub-problem of the problem to be solved, and running simulations for each of the established profiles to provide a result representing a solution to the problem to be solved.

Others of the above objects are obtained by a computer system embodied according to the present invention. The computer system is adapted to perform profiling and solving space mission problems for which a space mission analysis scenario has been created. The system includes a processor and a memory that is addressable by the processor. The memory includes software instructions adapted to enable the computer system to perform a number of steps, including setting up a control sequence that simulates a problem to be solved in the space mission, selecting control variables to be checked in solving the problem, and identifying parameters to be used in defining a desired results that represents an adequate solution to the problem. The software instructions are also adapted to enable the computer system to perform steps of establishing profiles for each particular sub-problem of the problem to be solved, and running simulations for each of the established profiles to provide a result representing a solution to the problem to be solved.

Still others of the above objects are obtained by a computer program product embodied according to the present invention. The computer program product enables a computer to perform profiling and to solve space mission problems for which a space mission analysis scenario has been created. The computer program product includes software instructions for enabling the computer to perform predetermined operations, and a computer readable medium embodying the software instructions. The predetermined operations include the steps of setting up a control sequence that simulates a problem to be solved in the space mission, selecting control variables to be checked in solving the problem, and identifying parameters to be used in defining a desired results that represents an adequate solution to the problem. The predetermined operations also include steps of establishing profiles for each particular sub-problem of the problem to be solved, and running simulations for each of the established profiles to provide a result representing a solution to the problem to be solved.

BRIEF DESCRIPTION OF THE DRAWINGS

FIG. 2 illustrates an example, according to an embodiment of the present invention, of a user specifying desired values for the goal elements of a mission.

FIG. 5 illustrates an example, according to an embodiment of the present invention, of a GUI panel showing nested MCS segments.

FIG. 6 illustrates a well-known Hohmann Transfer.

FIG. 9 illustrates a well known fast transfer orbit change.

DETAILED DESCRIPTION OF THE INVENTION

Figure 1:
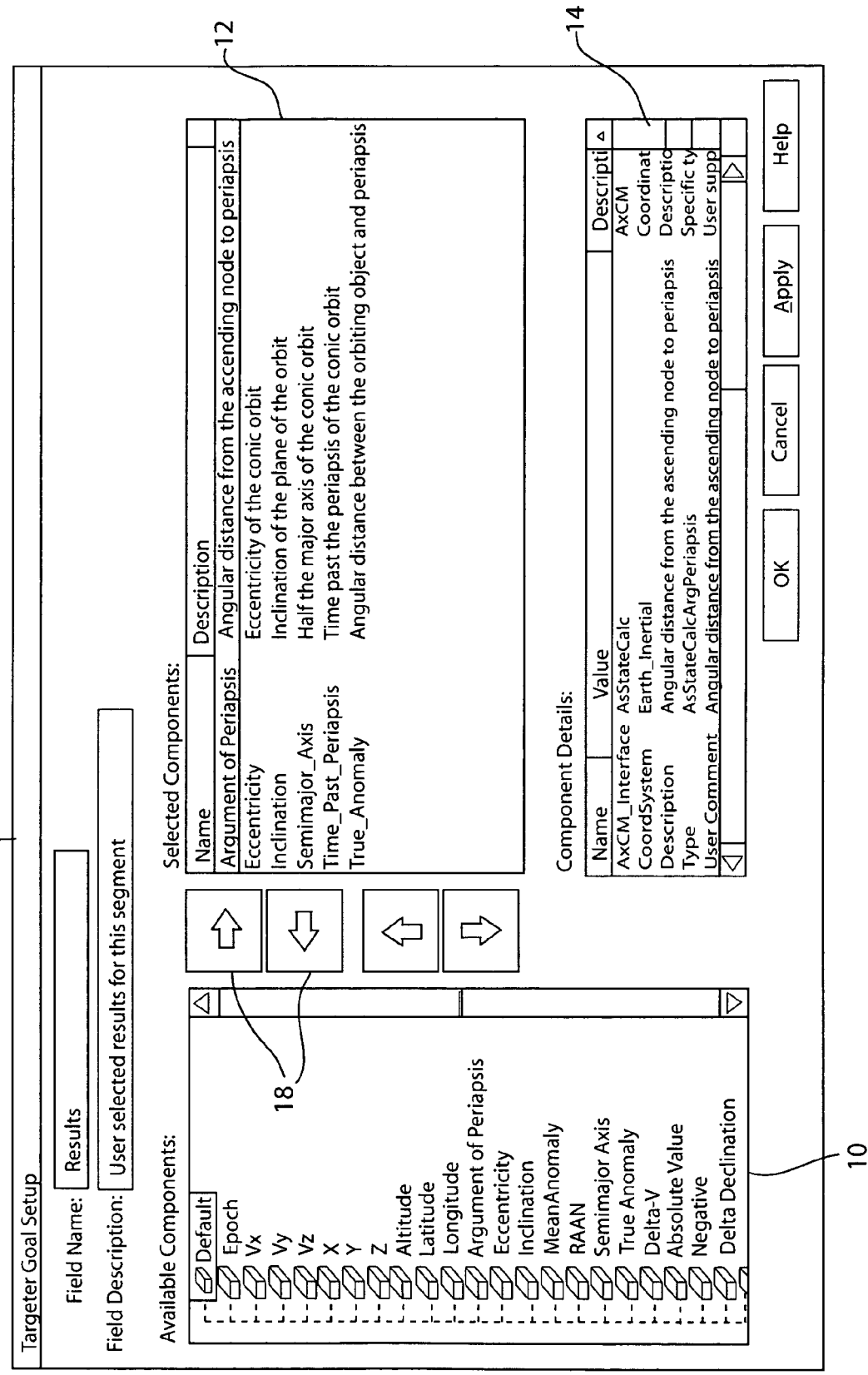
FIG. 1 illustrates an example, according to an embodiment of the present invention, of a GUI panel used for selecting components used in defining desired results (i.e., goals) for a given problem.

According to one embodiment of the present invention, a software program employs a graphical user interface (GUI) to allow the user to set up a series of sub-problems of any desired level of complexity. The program then implements the series automatically and sequentially, incorporating the solution to one sub-problem into the input to the next.

According to a preferred embodiment of the invention, the process claimed herein is carried out in the context of an existing space mission analysis software program, such as the Astrogator module of the Satellite Tool Kit (STK) program produced by Analytical Graphics, Inc. of Malvern, Pa. The technical literature for the Satellite Tool Kit program is incorporated herein by reference in its entirety, for all purposes.

Using an intuitive GUI, the invention is embodied to allow the analyst to specify different problems in the form of a set of profiles. Each profile comprises one or more selected target variables and one or more desired results. The user can select any given profile and have the program solve the associated problem. In addition, the user can specify a series of two or more profiles and have the software process them sequentially, as described above.

For example, using the STK Astrogator module, the analyst first creates a space mission analysis scenario. Within that scenario, the analyst sets up a control sequence that simulates the problems to be solved. The invention then allows the analyst, through a GUI, to select all the possible control variables that will be checked in solving the problems and to define components to be used in defining desired results that represent adequate solutions to the problems.

Once the control variables are selected and the desired results are specified, the analyst proceeds to the profiling of each particular sub-problem. Using a GUI panel specifically designed for this purpose, the analyst creates a profile specifying which of the previously selected controls should be varied, and what results should be achieved. The analyst can then use the invention to specify as many different profiles as needed, each with its own lists of controls and desired results.

The analyst can also flag each profile as active or inactive, directing the software program to run only those that are currently active. Since profiles and sequences thereof can be saved together with the space mission analysis scenario, this is a convenience to the analyst in the event that work must be re-run at a later date.

Once the profiles have been specified, the user can command the software via the GUI to run the profiles. After each profile is run, the invention collects the solution to the profile, and applies it as the initial starting point for the next profile (if appropriate).

The invention also allows the analyst to specify many different sets of profiles for different sub-sequences that make up the overall sequence. The invention further allows one or more sets of profiles to be automatically run as part of another set of profiles. In other words, in running a given sequence that is being investigated as part of a set of profiles, it may be necessary to run a different set of profiles as part of that sequence. The invention allows this "nesting" of profile sets.

When profiles are nested, the invention also allows the analyst to select a desired result of an inner profile to be used as a control variable in an outer profile. It also allows the solution of an inner profile to be used as a result of an outer profile.

As noted above, the present invention is a series of modules running on a computer system to accomplish the mission analysis described. The present invention is implemented via a general-purpose computer.

Referring to FIG. 1, the illustrated GUI panel is used for selecting components used in defining desired results ("goals") for a given problem. The Targeted Goal Setup screen 16 allows a user to establish goals and results for a given profile. A series of available "components" are displayed for the user in an "Available Components" window 10. This shows a user all of the components that are available for the user to specify, for example Eccentricity, Latitude, Altitude and all other components that a user might wish to vary in performing mission planning and analysis. Placement buttons 18 allow the user to select the components that the user wishes to vary.

When the user selects a component, it is transferred to a "Selected Components" window 12. Here the user can highlight the selected components for subsequent manipulation or specification. Alternatively, the user can de-select a component using the placement buttons 18.

When a user highlights a component in the component "Selected Components" window 12, the details and values associated with the selected component are displayed in a "Component Details" window 14 where they can be specified or modified.

Referring to FIG. 2, the screen for allowing a user to specify desired values for the goal elements and to determine which are to be used in a given profile is shown. Variables 20 are displayed for the user, as are goals 22 which can be specified by the user for various selected components. Goal elements 24, 26, 28 used in the given profile are marked with an 'x'. Note that in this example, a value is defined for the element of eccentricity, but that element is not used in the profile.

Figure 3:
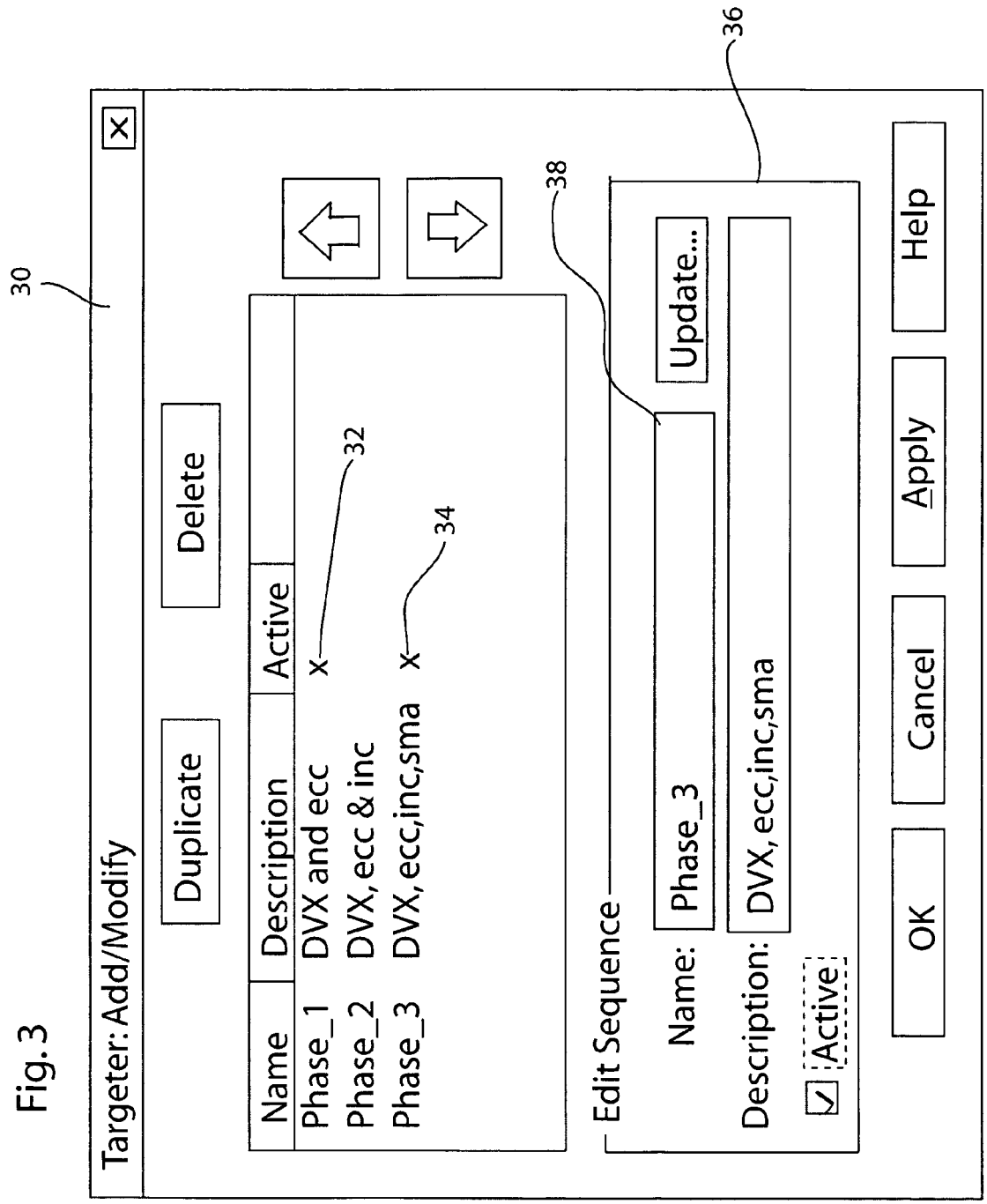
FIG. 3 illustrates an example, according to an embodiment of the present invention, of profiles being added and being re-ordered.

Referring to FIG. 3, the screen to add or modify profiles is illustrated. Profiles are added and can be re-ordered if desired in the Add/Modify screen 30 using the GUI of the present invention. Active profiles are marked with an 'x' 32, 34. In this example, the profile named "Phase-2" is not being run, whereas "Phase-1" and "Phase-3" are being run. This screen also allows a user to edit the profile being run in an Edit screen 36 which allows the user to select the profile to be edited 38.

Figure 4:
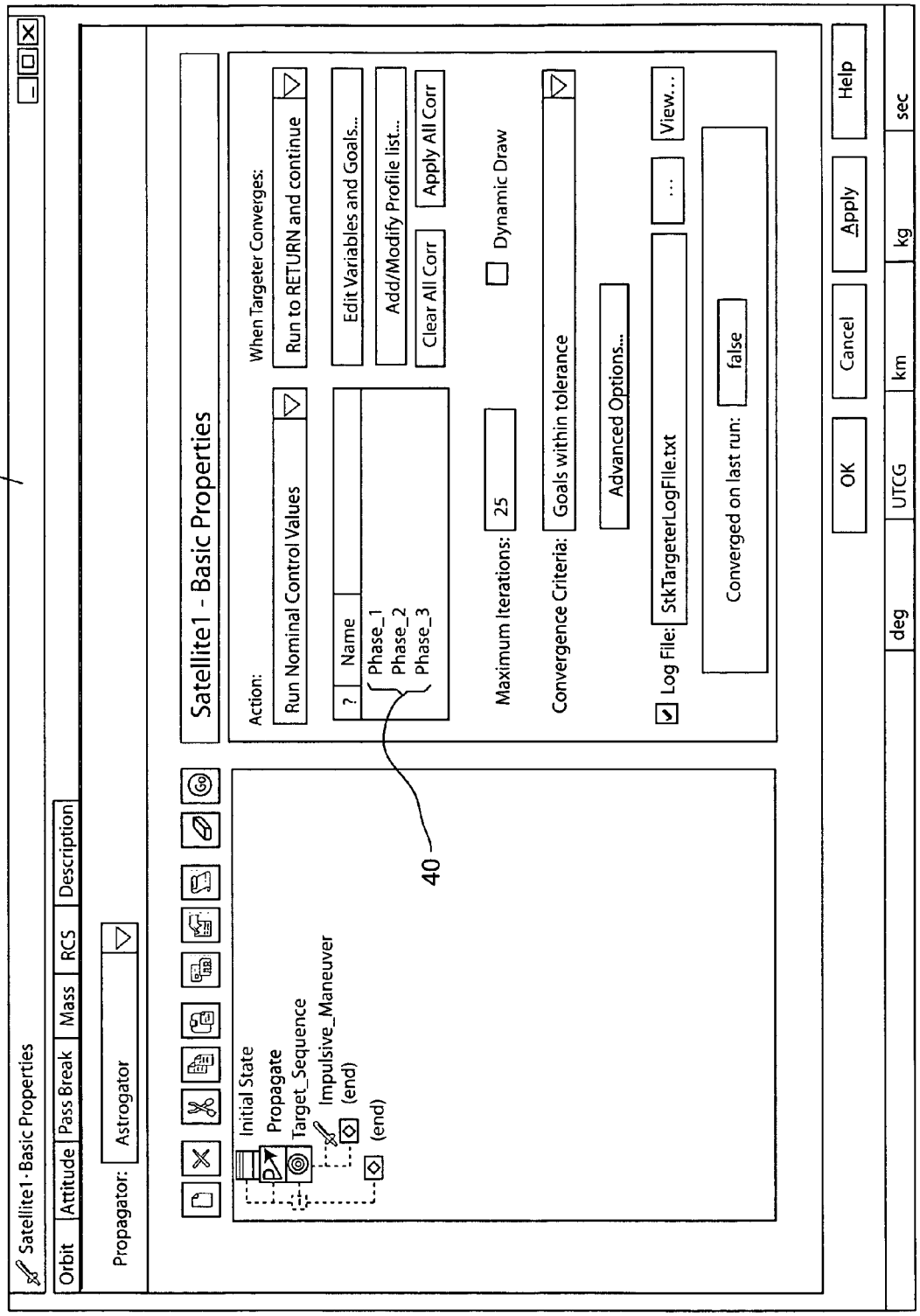
FIG. 4 illustrates an example, according to an embodiment of the present invention, of the Target Sequence window showing that three profiles have been defined for the space mission scenario.

Referring to FIG. 4, the Target Sequence window 42 is illustrated. The information in this window shows that three profiles 40 have been defined for this space mission scenario.

The system and method of the present invention operates using a number of standard processors known in the art. UNIX processors such as the Silicon Graphics SGI IMPACT™ and SGI 02™, each with the Reality Engine™ or the Infinite Reality™ engine; the IBM RS6000 with Evans & Sutherland Freedom graphics accelerator; the Hewlett-Packard™ HP9000™ with Evans & Sutherland graphics accelerator; the Sun Microsystems SPARC™ station with Evans & Sutherland Freedom graphics accelerator; the Sun Microsystems UltraSUN™ with Creator3D graphics hardware; Digital Equipment Corporation 4D50T and 4D60T processors, may each be used to implement the present invention. Microsoft Windows operating system hardware also can be used to implement the present invention with MS Windows, Windows95, and Windows NT operating systems with or without OpenGL Accelerators. Generally, all of the above systems should also have 48 Mbytes of memory and at least 75 Mbytes of hard drive space available.

In the preferred embodiment of the invention found in the STK Astrogator, an analyst forms the space mission scenario using the Mission Control Sequence (MCS) as illustrated in the left-side window of FIG. 4. By adding, removing, rearranging and editing MCS Segments, an analyst can define a mission of any desired level of complexity. The MCS is represented schematically by a tree structure appearing in the left pane of the Orbit tab of the Satellite Basic Properties window of FIG. 4. The MCS tree mirrors the timeline of events constituting the space mission.

MCS segments include Initial State, Launch, Maneuvers, Propagation, and Targeting segments, as well as Sequence, Return and Stop segments to control the sequence. In the Initial State segment, an analyst can select a coordinate system, enter orbital elements of several different types and configure the spacecraft's physical values from a stored set of files in the Astrogator Component Browser. For Launch segments, Astrogator provides the capability of modeling a simple spacecraft launch from Earth or another central body. Launch and burnout parameters can be specified, and additional options are provided concerning burnout velocity. It is used for data visualization and for some launch window calculations. The user inputs the launch site coordinates, launch time, time of flight for insertion, and insertion position and velocity in ECF (Earth-centered fixed) coordinates. The launch segment calculates a simple ellipse (in ECF) to connect the launch site with the insertion position. Typically, a launch vehicle manufacturer will supply a mission analyst with an insertion vector in the ECF frame, as well as the time of flight. Using Astrogator's Launch segment, you can then model the launch data received from the manufacturer and vary the launch time to meet other mission requirements.

For Maneuver segments, Astrogator provides two basic types of maneuvers—impulsive and finite—for use in constructing a space mission scenario. Both types of segments are available for building up a Mission Control Sequence in the Orbit tab of the Satellite Basic Properties window of FIG. 4. In addition, both of these maneuver types can be used as a basis for creating new segments with the Astrogator Component Browser. The Impulsive Maneuver segment models a maneuver as if it takes place instantaneously and without any change in the position of the spacecraft. This is the classic 'Delta-V' ($\Delta V$). The final state vector is calculated by applying the specified $\Delta V$ vector to the initial velocity vector (respecting the coordinate system, of course). The Finite Maneuver segment takes into account changes that occur throughout the duration of the maneuver by numerically integrating the effect of the acceleration from the engine.

The Targeting or Target Sequence segment gives Astrogator the powerful capability of modeling complex space flight situations quickly and accurately by defining maneuvers and propagations in terms of the goals they are intended to achieve. The method used is a differential corrector with a singular value decomposition algorithm. The differential corrector in Astrogator works by expressing the targeting problem in terms of a pseudo-Taylor series expansion of the goals G expressed as a function of the variables v. The problem can be represented by the expression:

$$G_1(v_1) = \vec{G}(\vec{r}, \vec{v}, t) = G_0 + \left[ \sum_{n=1}^{\infty} \frac{1}{n!} \frac{d^n G}{dv^n} \bigg|_{v=v_0} (v_1 - v_0)^n \right] \quad \text{Equation 1}$$

where the term in brackets is the Taylor series expansion of the equation for the goals G(v) expanded in terms of the variables v. Since the problem as stated involves a complicated combination of gravitating bodies and additional forces, there is no closed-form expression for G, and the Taylor series expansion cannot be performed analytically. In addition, even if a formula for G were available, the series expansion is in principle infinite and therefore impossible to solve exactly except in special cases. An alternative approach is to truncate the Taylor series expansion (Equation 3) at a convenient point and evaluate the resulting equation numerically. When the series is truncated at the first derivative, the following equation remains:

$$G_1(v_1) \approx G_0 + \frac{dG}{dv}(v_1 - v_0) \quad \text{Equation 2}$$

This equation can be rearranged to give:

$$G_1' = \frac{dG}{dv} \approx \frac{G_1 - G_0}{v_1 - v_0} \rightarrow \quad \text{Equation 3}$$

$$v_1 \approx v_0 + \frac{G_T - G_0}{G_1'} \rightarrow v_0 + (G_T - G_0)[G_1']^{-1}$$

Thus, we can find the value of $v_1$ that approximates the value of the variables needed to meet our goal $G_T$ if we know the initial value for the variable $v_0$ and can find an approximation to the derivative $G_1'$. To generate this approximation, we need only perturb each variable by some small amount δv and measure the resulting change in each goal G. Then, by the fundamental theorem of calculus, $$G'_1 = \frac{dG}{dv} = \lim_{\delta v \to 0} \frac{G(v + \delta v) - G(v)}{\delta v} \quad \text{Equation 4}$$

The limit cannot be taken to zero numerically because of the finite precision of your computer. When targeting a goal in Astrogator, the analyst can enter the value of the perturbation (v in this case) in the Perturbation field for the appropriate variable in the targeter, or can let Astrogator use a default value. The targeter then proceeds to run a nominal trajectory to calculate the starting value of the parameter describing the goal that was set. Then it adds the perturbation to the variable and performs the targeting sequence. This information is used in Equation 4 to calculate an approximate local value for the first derivative of the equation describing your goal. This value is then used in Equation 3 to determine a new estimate for the variable used in the targeter. This process is then repeated until the achieved value of the goal falls within the (user-specified) tolerance for the goal.

Several complications arise when the problem being solved contains more than one variable and goal. Equation 3 contains the inverse of the derivative operator. When the problem being solved contains two variables (say, x and y) and two goals (A and B), there are two equations that describe the solution:

$$f(x + \Delta x, y + \Delta y) = A \quad \text{Equations 5}$$
$$g(x + \Delta x, y + \Delta y) = B$$

Here f(x,y) is the equation describing the goal that has a targeted value of A, and g(x,y) is the equation describing the goal with a targeted value of B. Each of these equations is evaluated with the perturbation of each variable separately. The resulting matrix equation has the following form:

$$\begin{bmatrix} x_1 \\ y_1 \end{bmatrix} \approx \begin{bmatrix} x_0 \\ y_0 \end{bmatrix} + \begin{bmatrix} \frac{\partial f}{\partial x} & \frac{\partial f}{\partial y} \\ \frac{\partial g}{\partial x} & \frac{\partial g}{\partial y} \end{bmatrix}^{-1} \begin{bmatrix} A - f(x,y) \\ B - g(x,y) \end{bmatrix} = \quad \text{Equation 6}$$

$$\begin{bmatrix} x_0 \\ y_0 \end{bmatrix} + [\tilde{M}']^{-1} \begin{bmatrix} A - f(x,y) \\ B - g(x,y) \end{bmatrix}$$

The matrix $[\tilde{M}']^{-1}$ of the partial derivatives is called the 'sensitivity matrix.' This matrix must be invertible for the differential corrector to perform correctly; among other things, this means that there must be no degeneracy in the matrix. Astrogator uses a singular value decomposition (SVD) algorithm to invert this matrix.

Returning to the MCS, the Target Sequence segment has associated with it one or more nested MCS segments, such as maneuvers and propagate segments, for which control variables and constraints are defined. Setting up the targeter involves making certain selections within these nested segments and in the Target Sequence segment itself. Any segment can be nested in a target sequence, and it is not uncommon to have the entire MCS nested in a target sequence. An analyst can also insert a target sequence within another target sequence. Because the targeter references the nested segments by name, each segment within a target sequence should have a unique name.

Any element of a nested MCS segment that is available for selection as a control variable will be identified by a target icon appearing adjacent to it. To select a given element as a control variable, an analyst simply clicks the associated icon. The selection will be confirmed by the appearance of a check mark over the target icon. If the user changes his mind, he can click the icon again; the check mark will disappear. The user can select control variables in more than one nested segment and, in each, can select as many control variables as desired.

Targeter constraints are defined in terms of Astrogator's extensive repertoire of stored Calculation Objects (to which a user can add). The user can set constraints for a given nested MCS segment, as shown in FIGS. 1 and 2. Here, Calculation Objects are selected for constraint definition, but their desired values are specified in the window shown in FIG. 2. This window provides a means of defining and storing a number of alternative targeting profiles for use in your space mission scenario. A list of all profiles that have been defined for the current Target Sequence is displayed in the main Target Sequence in the right side of the window of FIG. 4.

The Sequence, Return and Stop segments assist you in structuring and controlling the execution of the Mission Control Sequence. The Astrogator user interface lets you name MCS segments, assign colors to certain types of segments and insert, delete, copy and move segments in the MCS tree. Segments in the MCS tree can be edited, copied, moved, added, or removed using the GUI.

The Sequence and Target Sequence segments introduce nested subsequences of MCS segments, such as the nested Impulsive Maneuver and Propagate segment shown in FIG. 5. Like the MCS itself, a nested subsequence will end in a Return segment that cannot be deleted.

Exercise #1: Hohmann Transfer

The Hohmann Transfer is, in terms of the velocity change (ΔV) required, the most efficient two-burn method of transferring between two circular, coplanar orbits. As shown in FIG. 6, a Hohmann Transfer uses an elliptical transfer orbit with its periapsis at the inner orbit and its apoapsis at the outer orbit. In the following exercise the purpose is to transfer a satellite from a low-Earth parking orbit with a radius of 6700 km to an outer circular orbit with a radius of 42,238 km.

This exercise and the one that follows are based on Example 3-6-1 in Hale, Francis J., *Introduction to Space Flight*, Englewood Cliffs, N.J.: Prentice-Hall (1994), pp. 43–44.

The values used here for the radii of the inner and outer orbits are for illustration purposes only. For further practice after completing this exercise, try substituting different values, such as a radius of 42,164.197 km (geosynchronous) for the outer orbit.

Since the ΔVs occur at the apsides, the horizontal flight path angle is zero at the time of each burn and the velocity vector of the transfer orbit at each apside is collinear with that of the respective circular orbit. Thus, in the case of a Hohmann Transfer between inner and outer orbits, $\Delta V_1$ is the additional thrust needed to increase the apoapsis of the orbit to the radius of the outer circle, and $\Delta V_2$ is the further thrust needed to circularize the orbit, i.e., to increase its periapsis to be equal to its apoapsis. To compute the ΔVs for the Hohmann Transfer, you need to know the velocity of the satellite in each of the circular orbits and at the apsides of the transfer ellipse. The velocities of the inner and outer orbits are given by:

$$V_i = \sqrt{\frac{\mu}{r_i}} = 7.713 \text{ km/sec} \quad V_o = \sqrt{\frac{\mu}{r_o}} = 3.072 \text{ km/sec}$$

where $\mu$ is the Earth's gravitational parameter and $r_1$ and $r_0$ are the radii of the respective orbits. The energy of the transfer orbit is given by $$\delta = \frac{-\mu}{r_i + r_o} = -8.145$$

Figure 7:
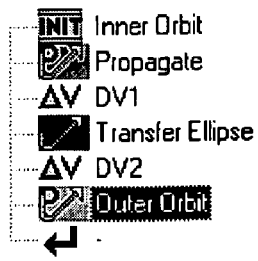
FIG. 7 illustrates an example, according to an embodiment of the present invention, of an MCS tree for the Hohmann transfer exercise #1.

Using the well-known vis viva equation and solving for velocity, $$V = \sqrt{2\left(\delta + \frac{\mu}{r}\right)} = -8.145$$

where $r=r_i$ at perigee and $r=r_o$ at apogee, the velocities at the apsides are $V_{t_o}=10.134$ km/sec $V_{t_o}=1.607$ km/sec Thus, $\Delta V_1 = V_{t_o} - V_i = 2.421$ km/sec $\Delta V_2 = V_o - V_{t_o} = 1.465$ km/sec The total velocity change required for the transfer is $\Delta V = \Delta V_1 + V_2 = 3.886$ km/sec To design a Hohmann transfer from a 6700 km parking orbit to a 42,238 km outer orbit, an analyst will use the following MCS segments, as illustrated in FIG. 7:

An Initial State defining a parking orbit with a radius of 6700 km
A segment to Propagate the parking orbit
An Impulsive Maneuver to enter the elliptical transfer orbit
A segment to Propagate the transfer orbit to apogee
An Impulsive Maneuver to enter the outer circular orbit
A segment to Propagate the outer orbit
The First Step, then, is to Define the Initial State.
1. The default MCS that appears at display of the satellite's Orbit tab probably already begins with an Initial State segment. If not, insert one at the beginning of the MCS.
2. Name the segment 'Inner Orbit'.
3. Select Modified Keplerian as the Element Type and set the Radius of Periapsis to 6700 km. All other elements should be set to zero.
4. Open the Spacecraft Physical Values window and set Fuel Mass to 5000 kg.
Next, Propagate the Parking Orbit.
1. If the second segment of the MCS is not already a Propagate segment, insert one in that position.
2. Select Earth Point Mass as the Propagator.
3. Set the Duration to 2 hours (7200 sec), more than enough to have the satellite orbit one complete pass.

Then, Maneuver into the Transfer Ellipse.
1. Insert, as the third segment of the MCS, an Impulsive Maneuver.
2. Name the segment 'DV1'.
3. Select Cartesian as the Vector Type.
4. Select VNC Thrust Axes.
5. Set the X (Velocity) component to 2.421 km/sec. This will apply all the ΔV in the thrust direction.
6. Turn ON the Decrement Mass Based on Fuel Usage option.
Propagate the Transfer Orbit to Apogee.
1. Insert, as the fourth segment of the MCS, another Propagate segment.
2. Name the segment 'Transfer Ellipse' and select a color that will distinguish it from the first Propagate segment.
3. Select Earth Point Mass as the Propagator.
4. Select Apoapsis as the Stopping Condition.
Maneuver into the Outer Orbit
1. Insert, as the fifth segment of the MCS, another Impulsive Maneuver.
2. Name the segment 'DV2'.
3. Select Cartesian as the Vector Type.
4. Select VNC Thrust Axes.
5. Set the X (Velocity) component to 1.465 km/sec.
6. Turn ON the Decrement Mass Based on Fuel Usage option.
Propagate the Outer Orbit
1. Insert, as the final segment of the MCS, a Propagate segment.
2. Name the segment 'Outer Orbit' and select a color that will distinguish it from the other two Propagate segments.
3. Select Earth Point Mass as the Propagator.
4. Set the Duration to 24 hours (86400 sec), so that the satellite will make a complete orbit pass (and one will be drawn in the Map window).

The MCS tree should appear as illustrated in FIG. 7 when finished. Running the MCS should produce a map similar to FIG. 6. A summary report will show that the calculated semi-major axis of the outer orbit is very, very close to the desired value of 42,238 km. Also, the final Fuel Mass will show the fuel used.

Figure 8:
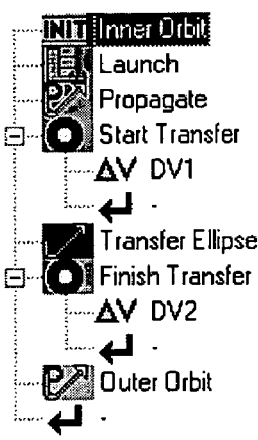
FIG. 8 illustrates an example, according to an embodiment of the present invention, of an MCS tree for the Hohmann transfer exercise #2.

Exercise #2: Hohmann Transfer using the Targeter
In the other Hohmann Transfer exercise, pre-calculated values for the two required ΔVs were entered. In this exercise, we will let Astrogator do the work of calculating the ΔVs, using its targeting capability. Here, as in the other exercise, the purpose is to transfer a satellite from a low-Earth parking orbit with a radius of 6700 km to an outer circular orbit with a radius of 42,238 km.
This exercise and the preceding one are based on Example 3-6-1 in Hale, Francis J., *Introduction to Space Flight*, Englewood Cliffs, N.J.: Prentice-Hall (1994), pp. 43–44.
The values used here for the radii of the inner and outer orbits are for illustration purposes only. For further practice after completing this exercise, try substituting different values, such as a radius of 42,164.197 km (geosynchronous) for the outer orbit.
To design a Hohmann transfer from a 6700 km parking orbit to a 42,238 km outer orbit, one will use the following MCS segments, as illustrated in FIG. 8:
An Initial State defining a parking orbit with a radius of 6700 km
A segment to Propagate the parking orbit A Target Sequence containing an Impulsive Maneuver to enter the elliptical transfer orbit A segment to Propagate the transfer orbit to apogee A Target Sequence containing an Impulsive Maneuver to enter the outer circular orbit A segment to Propagate the outer orbit First, Define the Initial State.
1. The default MCS that appears when you display the satellite's Orbit tab probably already begins with an Initial State segment. If not, insert one at the beginning of the MCS.
2. Name the segment 'Inner Orbit'.
3. Select Modified Keplerian as the Element Type and set the Radius of Periapsis to 6700 km. All other elements should be set to zero.

Next, Propagate the Parking Orbit.
1. If the second segment of the MCS is not already a Propagate segment, insert one in that position.
2. Select Earth Point Mass as the Propagator.
3. Set the Duration to 2 hours (7200 sec), more than enough to have the satellite orbit one complete pass.

Then, Maneuver into the Transfer Ellipse. Unlike the prior exercise, this time use the targeter to calculate the ΔV required to move the spacecraft from the parking orbit into the transfer orbit. The goal of the targeter will be defined in terms of the radius of apoapsis of the transfer ellipse, coinciding with the radius of the desired final orbit. This is done with the following nesting:

Define a Target Sequence.
1. Insert a Target Sequence segment.
2. Name the Target Sequence segment 'Start Transfer'.
3. Nest an Impulsive Maneuver in the Target Sequence.
4. Name the nested Impulsive Maneuver segment 'DV1'.

Select a Control Variable and Constraint Element.
1. Highlight the nested Impulsive Maneuver and Select Cartesian as the Vector Type.
2. Select VNC Thrust Axes.
3. Select the X (Velocity) component as the sole control variable.
4. Select Radius of Apoapsis as the only constraint element.

Set up the Targeter.
1. With the Target Sequence highlighted, open the Targeter Controls and Constraints window.
2. Set the Desired value for Radius of Apoapsis to 42238 km.
3. Set the Convergence Tolerance to 0.1 and the Maximum Step to 0.3 km/sec, and close the window.
4. Increase the Maximum Iterations amount to 50 and select the Display Popup option.
5. Make sure the targeter is turned on (select Run Targeter in the Action field).

Then, Propagate the Transfer Orbit to Apogee.
1. Insert another Propagate segment.
2. Name the segment 'Transfer Ellipse'.
3. Select Earth Point Mass as the Propagator.
4. Select Apoapsis as the Stopping Condition.

Maneuver into the Outer Orbit. Here we will use the targeter to calculate the ΔV required to move the spacecraft from the transfer orbit into the circular outer orbit. With the desired radius already achieved, the goal will be to circularize the orbit, i.e., change its eccentricity to zero.

Define a Target Sequence.
1. Insert another Target Sequence segment.
2. Name the Target Sequence segment 'Finish Transfer'.
3. Nest an Impulsive Maneuver in the Target Sequence.
4. Name the nested Impulsive Maneuver segment 'DV2'.

Select a Control Variable and Constraint Element.
1. Highlight the nested Impulsive Maneuver ('DV2') and Select Cartesian as the Vector Type.
2. Select VNC Thrust Axes.
3. Select the X (Velocity) component as the sole control variable.
4. Select Eccentricity as the only constraint element.

Set up the Targeter.
1. With the Target Sequence highlighted, open the Targeter Controls and Constraints window.
2. Leave the Desired value for Eccentricity at its default value of zero.
3. Set the Maximum Step to 0.3 km/sec and close the window.
4. Select the Display Popup option and make sure the targeter is turned on (select Run Targeter in the Action field).

Propagate the Outer Orbit.
1. Insert a Propagate segment.
2. Name the segment 'Outer Orbit'.
3. Select Earth Point Mass as the Propagator.
4. Set the Duration to 24 hours (86400 sec), so that the satellite will make a complete orbit pass (and one will be drawn in the Map window).

The MCS tree should appear as shown in FIG. 8 when finished.

Exercise #3: Fast Transfer (Using Targeter)

Here, as in the Hohmann Transfer and targeting exercises #1 and #2, the purpose is to transfer a satellite from a low-Earth parking orbit with a radius of 6700 km to an outer circular orbit with a radius of 42,238 km. While a Hohmann Transfer is the most efficient two-burn maneuver to use in this situation, it is also one of the slowest. Among other things, the satellite is required to travel the entire length of the elliptical transfer orbit, including the approach to apoapsis, where its velocity is considerably slower than in the portion of the orbit near periapsis. If it is of great importance to reduce the time of flight (e.g. for a rendezvous or a planetary intercept) a maneuver such as that shown in FIG. 9 can be used. This maneuver, known as a fast transfer, is considerably faster than a Hohmann Transfer, but, of course, it uses more fuel.

This exercise is based on Example 3-6-5 in Hale, Francis J., *Introduction to Space Flight*, Englewood Cliffs, N.J.: Prentice-Hall (1994), pp. 48–50.

The values used here for the radii of the inner and outer orbits are for illustration purposes only. For further practice after completing this exercise, try substituting different values, such as a radius of 42,164.197 km (geosynchronous) for the outer orbit.

Figure 10:
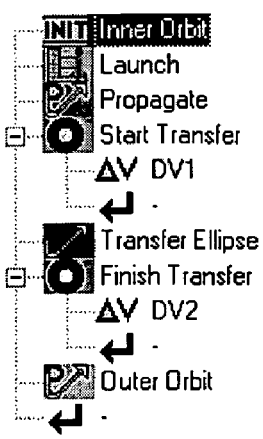
FIG. 10 illustrates an example, according to an embodiment of the present invention, of an MCS tree for the fast transfer exercise #3.

To design a fast transfer from a 6700 km parking orbit to a 42,238 km outer orbit, you will use the following MCS segments, as illustrated in FIG. 10:

An Initial State defining a parking orbit with a radius of 6700 km

A segment to Propagate the parking orbit

A Target Sequence containing an Impulsive Maneuver to enter a large elliptical transfer orbit (aiming at twice the desired radius of apoapsis)

A segment to Propagate the transfer orbit halfway to apoapsis

A Target Sequence containing an Impulsive Maneuver to cut short the transfer trajectory and enter the outer circular orbit (the fast transfer)

A segment to Propagate the outer orbit

Again, Define the Initial State.
1. The default MCS that appears when you display the satellite's Orbit tab probably already begins with an Initial State segment. If not, insert one at the beginning of the MCS.
2. Name the segment 'Inner Orbit'.
3. Select Modified Keplerian as the Element Type and set the Radius of Periapsis to 6700 km. All other elements should be set to zero.
4. Open the Spacecraft Physical Values window and set Fuel Mass to 5000 kg.

Next, Propagate the Parking Orbit.
1. If the second segment of the MCS is not already a Propagate segment, insert one in that position.
2. Select Earth Point Mass as the Propagator.
3. If you wish, select a different color for the segment.
4. Set the Duration to 2 hours (7200 sec), more than enough to have the satellite orbit one complete pass.

Then, Maneuver into the Transfer Ellipse.
Now use the targeter to calculate the $\Delta V$ required to move the spacecraft from the parking orbit into the transfer orbit. The goal of the targeter will be defined in terms of the radius of apoapsis of the transfer ellipse, twice the radius of the desired final orbit.

Define a Target Sequence.
1. Insert a Target Sequence segment.
2. Name the Target Sequence segment 'Start Transfer'.
3. Nest an Impulsive Maneuver in the Target Sequence.
4. Name the nested Impulsive Maneuver segment 'DV1'.

Select a Control Variable and Constraint Element.
1. Highlight the nested Impulsive Maneuver and Select Cartesian as the Vector Type.
2. Select VNC Thrust Axes.
3. Select the X (Velocity) component as the sole control variable.
4. Select Radius of Apoapsis as the only constraint element
5. Turn ON the Decrement Mass Based on Fuel Usage option.

Set up the Targeter.
1. With the Target Sequence highlighted, open the Targeter Controls and Constraints window.
2. Set the Desired Value for Radius of Apoapsis to 88176 km.
3. Set the convergence tolerance to 0.1 and close the window.
4. Increase the Maximum Iterations amount to 50 and select the Display Popup option.
5. Make sure the targeter is turned on (select Run Targeter in the Action field).

Propagate the Transfer Orbit to 42,238 km.
1. Insert another Propagate segment.
2. Name the segment 'Transfer Ellipse' and select a color that will distinguish it from the first Propagate segment.
3. Select Earth Point Mass as the Propagator.
4. Select R Magnitude as the Stopping Condition and set the trip value to 42238 km.

Maneuver into the Outer Orbit.
Here we will use the targeter to calculate the $\Delta V$ required to break out of the transfer orbit midway to apogee and enter the outer circular orbit. The goal will be to circularize the orbit, i.e., change its eccentricity to zero.

Define a Target Sequence.
1. Insert another Target Sequence segment.
2. Name the Target Sequence segment 'Finish Transfer'.
3. Nest an Impulsive Maneuver in the Target Sequence.
4. Name the nested Impulsive Maneuver segment 'DV2'.

Select Control Variables and Constraint Elements.
1. Highlight the nested Impulsive Maneuver ('DV2') and Select Cartesian as the Vector Type.
2. Select VNC Thrust Axes.
3. Select the X (Velocity) and Z (Co-Normal) components as the control variables.
4. Select Eccentricity and Horizontal Flight Path Angle as constraint elements.
5. Turn ON the Decrement Mass Based on Fuel Usage option.

Set up the Targeter.
1. With the Target Sequence highlighted, open the Targeter Controls and Constraints window.
2. Leave the Desired Values for Eccentricity and Horizontal Flight Path Angle at their default values of zero.
3. Set the Maximum Step for each of the control variables at 0.3 km/sec and close the window.
4. Increase the Maximum Iterations amount to 50 and select the Display Popup option.
5. Make sure the targeter is turned on (select Run Targeter in the Action field).

Propagate the Outer Orbit.
1. Insert a Propagate segment.
2. Name the segment 'Outer Orbit' and select a color that will distinguish it from the other two Propagate segments.
3. Select Earth Point Mass as the Propagator.
4. Set the Duration to 24 hours (86400 sec), so that the satellite will make a complete orbit pass (and one will be drawn in the Map window).

The MCS tree should appear as shown in FIG. 10 when finished. Upon running the MCS, the Popup window should show a sharp turn from the transfer trajectory into the final orbit, similar to that shown in FIG. 9. Because of the change in direction, it is necessary to select two components of the second $\Delta V$ as control variables.

Highlight the second Target Sequence segment, open the Targeter Controls and Constraints window and note the New Values for the Control Variables. Using these values to compute the value of $\Delta V_2$, $$\Delta V_2 = \sqrt{(-1.652)^2 + (-2.632)^2} = 3.107 \text{ km/sec}$$

yields a result that is very close to that reached via the Law of Cosines.

The New Values you observe may differ slightly from those shown here, depending, e.g., on the Convergence Tolerance you use for Eccentricity in the second Target Sequence. Why are the correction values negative? Because we are transferring into a lower energy orbit and slowing down.

As these exercises show, a fast transfer is more expensive in terms of $\Delta V$, but takes considerably less time, than a Hohmann transfer. You can also confirm this by running a Summary for the final Propagate segment and comparing the final Fuel Mass value with that for the Hohmann Transfer exercise.

In the Fast Transfer shown in FIG. 9, $\Delta V_1$ is, as in the case of a Hohmann Transfer, carried out at periapsis of the transfer trajectory. However, the radius of apoapsis of the transfer orbit is greater than the radius of the outer circular orbit, and, instead of proceeding to apoapsis, the journey of the satellite is interrupted by a second burn when it reaches the desired final radius. It can be seen that $\Delta V_2$ changes not only the magnitude of the velocity vector but also its direction.

This discussion and the related exercise are based on Example 3-6-5 in Hale, Francis J., *Introduction to Space Flight*, Englewood Cliffs, N.J.: Prentice-Hall (1994), pp. 48–50.

Derivation of Values used for Delta-Vs

The amount of $\Delta V$ needed can be calculated using the Law of Cosines, where $V_o$ is the velocity of the outer orbit, $V_t$ is the velocity of the transfer orbit where it intersects the outer orbit, and $\alpha$ is the angle between $\vec{V}_o$ and $\vec{V}_t$ $$\Delta V_2 = \sqrt{V_o^2 + V_t^2 - 2V_oV_t\cos\alpha}$$

The transfer trajectory can be a parabola or hyperbola instead of an ellipse, but an ellipse is the usual choice. For the Fast Transfer you are using a transfer ellipse with a semimajor axis twice as large as that of the one you used in the Hohmann Transfer, which was 42,238 km. The energy of the transfer orbit is $$\delta = \frac{-\mu}{2a} = -4.072 \times 10^6 \text{ m}^2/\text{sec}^2$$

where a is the semimajor axis. The velocities at periapsis of the transfer trajectory and at the point where it intersects the outer orbit are, respectively, $$V_{t_o} = \sqrt{2\left(\delta + \frac{\mu}{r_i}\right)} = 10.528 \text{ km/sec}$$

$$V_{t_o} = \sqrt{2\left(\delta + \frac{\mu}{r_o}\right)} = 3.276 \text{ km/sec}$$

Recalling that $V_i$=7.713 km/sec, we can calculate $\Delta V_1$ in the same manner as for the Hohmann Transfer:

$$\Delta V_1 = V_{t_o} - V_i = 2.814 \text{ km/sec}$$

Notice that $\Delta V_1$ is greater here than in the Hohmann Transfer, since the Fast Transfer ellipse has a greater semimajor axis and, consequently, a greater specific mechanical energy than the Hohmann ellipse.

Before we can apply the Law of Cosines to compute $\Delta V_2$, we need to know the angle $\alpha$ between the velocity vector of the spacecraft in the transfer orbit and its velocity vector after transferring to the outer circular orbit (see FIG. 9). It will help here (and in calculating time of flight) to know the eccentricity of the Fast Transfer ellipse and the true anomaly of the spacecraft's position at the intersection between the transfer trajectory and the outer circular orbit. Since we know the radius of periapsis and semimajor axis of the transfer ellipse, we can derive its eccentricity from the relationship $r_p = a(1-e)$:

$$e = 1 - \frac{r_p}{a} = 0.8631$$

The ellipse's semilatus rectum is given by $$p = a(1-e^2) = 12,482 \text{ km}$$

With e and p, you can determine the true anomaly at $r_o$:

$$v_o = \cos^{-1}\left[\frac{1}{e}\left(\frac{p}{r_o} - 1\right)\right] = 144.7 \text{ deg}$$

The angle between the two velocity vectors is $$\alpha = \tan^{-1}\left(\frac{e\sin V_o}{1 + e\cos V_o}\right) = 59.35 \text{ deg}$$

Thus, $$\Delta V_2 = \sqrt{V_{t_o}^2 + V_o^2 - 2V_{t_o}V_o\cos\alpha} = 3.148 \text{ km/sec}$$

and the total $\Delta V$ needed for the Fast Transfer is $$\Delta V = \Delta V_1 + \Delta V_2 = 5.962 \text{ km/sec}$$

which is more than 50% greater than that needed for the Hohmann Transfer.

As can be seen by these exercises, the Fast Transfer is more than 50% more expensive than a Hohmann Transfer that achieves the same result. However, it is also nearly twice as fast. This information is useful for space mission analysis.

Since the Hohmann transfer begins at periapsis and ends at apoapsis of the transfer ellipse, the time of flight (TOF) is just half the period of the ellipse, i.e.

$$TOF = \pi\sqrt{\frac{a^3}{\mu}} = 19,046 \text{ seconds} = 5.29 \text{ hours}$$

For the Fast Transfer, first calculate eccentric anomaly (E):

$$E = \cos^{-1}\left(\frac{e + \cos V}{1 + e\cos V}\right) = 80.9° = 1.411 \text{ rad}$$

Then apply Kepler's Equation to derive mean anomaly (M):

$$M = E - e\sin E = 0.559 \text{ rad}$$

Finally, use the mean anomaly value to calculate TOF:

$$TOF = \left(\sqrt{\frac{a^3}{\mu}}\right)M = 9585 \text{ seconds} = 2.66 \text{ hours}$$

Again, the greater speed of the Fast Transfer is not surprising, given the fact that it occurs about halfway between perigee and apogee of the transfer ellipse and does not include the significant slowing down that occurs when an orbiting body approaches apoapsis.

A system and method for sequentially profiling and solving problems in space mission analysis has been disclosed. It will be appreciated by those skilled in the art that other variations may be possible without departing from the scope of the invention as disclosed.

What is claimed is:

1. A method for profiling and solving space mission problems, the method comprising:
   creating a space mission analysis scenario;
   setting up a control sequence that simulates a problem to be solved in the space mission;
   selecting control variables to be checked in solving the problem;
   identifying parameters to be used in defining desired results that represent an adequate solution to the problem;
   establishing profiles for each particular sub-problem of the problem to be solved by:
      specifying which of the previously selected control variables should be varied for each particular sub-problem, and
      specifying what results should be achieved for each particular sub-problem; and
   running simulations for each of the established profiles to provide a result representing a solution to the problem to be solved.

2. The method of claim 1, wherein the step of running simulations for each of the established profiles comprises:
   after each profile is run, collecting the solution to that profile, and, in the event that there is a subsequent profile to be run, applying it as the initial starting point for a subsequent profile; and
   collecting the solution to the last profile and providing it as the result representing a solution to the problem to be solved.

3. A computer system adapted to perform profiling and solving space mission problems for which a space mission analysis scenario has been created, the system comprising:
   a processor;
   a memory, addressable by the processor, including software instructions adapted to enable the computer system to perform the steps of:
      setting up a control sequence that simulates a problem to be solved in the space mission;
      selecting control variables to be checked in solving the problem;
      identifying parameters to be used in defining desired results that represents an adequate solution to the problem;
      establishing profiles for each particular sub-problem of the problem to be solved
         specifying which of the previously selected control variables should be varied for each particular sub-problem, and
         specifying what results should be achieved for each particular sub-problem; and
      running simulations for each of the established profiles to provide a result representing a solution to the problem to be solved.

4. The computer system of claim 3, wherein the step of running simulations for each of the established profiles comprises:
   after each profile is run, collecting the solution to that profile, and, in the event that there is a subsequent profile to be run, applying it as the initial starting point for a subsequent profile; and
   collecting the solution to the last profile and providing it as the result representing a solution to the problem to be solved.

5. A computer program product for enabling a computer to perform profiling and solving space mission problems for which a space mission analysis scenario has been created, the computer program product comprising:
   software instructions for enabling the computer to perform predetermined operations, and
   a computer readable medium embodying the software instructions;
   the predetermined operations including the steps of:
   setting up a control sequence that simulates a problem to be solved in the space mission;
   selecting control variables to be checked in solving the problem;
   identifying parameters to be used in defining desired results that represents an adequate solution to the problem;
   establishing profiles for each particular sub-problem of the problem to be solved by:
      specifying which of the previously selected control variables should be varied for each particular sub-problem; and
      specifying what results should be achieved for each particular sub-problem; and
   running simulations for each of the established profiles to provide a result representing a solution to the problem to be solved.

6. The computer program product of claim 5, wherein the step of running simulations for each of the established profiles comprises:
   after each profile is run, collecting the solution to that profile, and, in the event that there is a subsequent profile to be run, applying it as the initial starting point for a subsequent profile; and
   collecting the solution to the last profile and providing it as the result representing a solution to the problem to be solved.

* * * * *